United States Patent [19]

Kroneld et al.

[11] Patent Number: 4,946,559
[45] Date of Patent: Aug. 7, 1990

[54] REMOVAL OF DISSOLVED VOLATILE IMPURITIES FROM LIQUID

[75] Inventors: Rolf Kroneld; Markku Reunanen, both of Turku; Esko Huhta-Koivisto, Espoo, all of Finland

[73] Assignee: Oy Santasalo-Sohlberg AB, Finland

[21] Appl. No.: 266,791

[22] Filed: Nov. 3, 1988

[30] Foreign Application Priority Data

Nov. 3, 1987 [FI] Finland .................................. 874831

[51] Int. Cl.$^5$ .............................. C02F 1/08; C02F 1/20
[52] U.S. Cl. .......................................... 203/4; 55/42;
 55/201; 159/13.1; 159/43.1; 159/49; 159/DIG.
 8; 202/182; 202/197; 202/236; 202/262;
 203/10; 203/14; 203/40; 203/72; 203/89;
 210/188; 210/774
[58] Field of Search ................... 203/89, 4, 72, 10, 14,
 203/40; 202/236, 176, 174, 197, 182, 262;
 159/49, 13.1, 43.1, 17.1, DIG. 8; 55/42, 165,
 201; 210/188, 774

[56] References Cited

U.S. PATENT DOCUMENTS

| | | | |
|---|---|---|---|
| 736,240 | 8/1903 | Erben et al. | 202/237 |
| 1,372,880 | 3/1921 | Hills | 202/202 |
| 2,645,607 | 7/1953 | Allen | 55/165 |
| 3,766,020 | 10/1973 | Sieder | 203/4 |
| 3,975,241 | 8/1976 | Smith | 202/202 |
| 3,985,626 | 10/1976 | Klein | 55/165 |
| 4,084,944 | 4/1978 | Chirico | 55/42 |
| 4,236,974 | 12/1980 | Kühnlein | 203/11 |
| 4,279,693 | 7/1981 | Kühnlein et al. | 159/473 |
| 4,482,431 | 11/1984 | Voorhees | 203/10 |
| 4,698,076 | 10/1987 | Bekedam | 55/201 |
| 4,698,136 | 10/1987 | El-Allawy | 203/11 |
| 4,755,194 | 7/1988 | Rooka et al. | 55/201 |

FOREIGN PATENT DOCUMENTS 0859879 12/1952 Fed. Rep. of Germany .

Primary Examiner—Virginia Manoharan
Attorney, Agent, or Firm—Steinberg & Raskin

[57] ABSTRACT

A method and device for removing, from liquid such as water, dissolved volatile substances and gases when water is being distilled or evaporated. Feed water of a distilling apparatus or evaporator is heated to a sufficiently high temperature, whereby part of the feed water changes into vapor, and is then conducted to a purifying device. The feed water is discharged in the purifying device in the form of a thin film. The gaseous substances present in the feed water or liquid are separated by a separator device provided in the purifying device, and then conducted away through a connector provided on the purifying device.

4 Claims, 2 Drawing Sheets

REMOVAL OF DISSOLVED VOLATILE IMPURITIES FROM LIQUID

BACKGROUND OF THE INVENTION

The present invention concerns a procedure and a device for removing from water, when water is being evaporated or distilled, volatile substances such as hydrocarbons, halogenated hydrocarbons, alkanes, alkenes, methanes, chlorophenols, and benzene derivatives.

Presence of halogenated hydrocarbons in the environment and in man, which has recently received increasing attention, may be noted as an example. The most common procedure applied in purification is chlorination of water, in connection with which halogenated hydrocarbons originating from chlorine are formed in the water and remain therein. In the environment, halogenated hydrocarbons occur, e.g., in chlorine-disinfected drinking water, and such halogenated hydrocarbons have also been found in human serum and urine. Table 1 is a listing of the occurrence of certain volatile impurities. In the case of volatile hydrocarbons, trihalomethanes may be noted among these major groups listed in Table 1, with chloroform being the most notable among these trihalomethanes. Halogenated hydrocarbons are toxic, carcinogenic, mutagenic and teratogenic to humans. The halogenated hydrocarbons possess lipophilic character and therefore accumulate in tissues, even when present at minimal concentrations in the environment.

It has now been demonstrated that this matter is timely and topical, for instance in the case of patients to whom prolonged fluid therapy has been prescribed, and to whom such accumulations of toxic substances may become fatal.

The compounds in questions are low-molecular and hard to evaporate when dissolved. Experience has demonstrated that these compounds cannot be completely removed from water by any conventional procedures such as activated carbon filtration or even inverted osmosis. Referring to volatile hydrocarbons, this is particularly true concerning chloroform ($CHCl_3$), which is most common among these volatile hydrocarbons. These compounds also fail to be removed in conventional distilling processes, in which these compounds travel along with the vapor to the distillate, instead.

According to patent DE-859879, excess chlorine is removed by conducting air and ultrasonic vibrations into the water to be purified, whereby chlorine departs along with the air bubbles.

It is common knowledge that the toxic substances noted above can be removed from water by using air, whereby the concentration of halogenated hydrocarbons is also reduced. However, a drawback of this method is that it requires an additive to the apparatus which is superfluous in view of the distilling process to be conducted, namely compressed air. Furthermore the required air quantity with which purification is effected is quite large, while the standard of purity which is required to be met is difficult to achieve.

SUMMARY OF THE INvENTION

Accordingly, it is an object of the present invention to remove impurities from feed liquid, i.e. feed water of a distilling apparatus, in connection with preparation of water or liquid to be used for medical infusion, injection and dialysis fluids, thus avoiding the difficulties noted above.

These and other objects which will become apparent below, are attained by the present invention which is directed to a method for removing dissolved volatile substance from liquid, which comprises the steps of heating the liquid to a sufficiently high temperature at which part of the liquid changes into gas, conducting the remaining liquid to a purifying device and discharging the liquid in the form of a thin film into the purifying device, whereby more of the liquid changes into the gas, and separating the gas from the remaining liquid and conducting the gas away from the liquid. The volatile substance present in the liquid is thus removed from the liquid.

Preferably, the liquid is water and the gas is vapor, while the method can involve the additional step of distilling the remaining liquid after removal from the purifying device. The gas is preferably separated from the remaining liquid in a separator device provided within the purifying device itself.

The present invention is also directed to a device for removing dissolved volatile substance from liquid which comprises an inlet connector for connection to a source of the liquid to be purified and for conducting the liquid to the device, a disperser member for spreading the liquid in the device, means for separating gas including the volatile substance, and an outlet pipe for conducting the gas out of the device. Preferably, the source of the liquid is a distilling apparatus or steam generator.

The procedure in accordance with the present invention is characterized by the feed water for the distilling apparatus or evaporator being heated to a high enough temperature so that part of the feed water is allowed to develop or turn into vapor, followed by conduction to purifying means where the feed water is caused to discharge in the purifying means in the form of a thin film. The gaseous substances present in the feed water are separated with separator means provided in the purifying means, and are carried off through a connector provided on the purifying means.

In the procedure of the present invention, the feed water of the distilling apparatus is heated to a high enough temperature and a small part thereof is allowed to be converted to so-called carrier vapor. The feed water is disposed to be discharged into the purifying means in the form of a thin jet ring into a space in which lower pressure prevails, so that part of the water evaporates or vaporizes and the resulting vapor disperses the jet into numerous droplets. This jet impinges upon the walls of the purifying means, which contributes to converting the volatile impurities into gaseous form. While the water or liquid further runs down along the walls, these minute gas elements or particles join the vapor that is set free from the water or liquid, and this carrier vapor together with the gaseous impurities admixed thereto is conducted off through a connector provided on the purifying means.

The means or device of the present invention is characterized by the purifying means being connected to a distilling apparatus or steam generator, with feed water that is being purified being conducted into the purifying means. Furthermore, the purifying means comprise a dispersing member for spreading the feed water in the purifying means, separator means for separating the vapor and the gaseous impurities, and an outlet pipe for conducting the gas out from the purifying means.

The present invention is characterized by separation of these gases being carried out at high temperature, with utilization of carrier vapor. The purifying means may be connected to the distilling apparatus in such a manner that one or several units are connected in series. A heat exchanger may be disposed before the purifying means to superheat the water, so that the water will partially evaporate or vaporize when the pressure falls.

The purifying means also separate other gases dissolved in the water, which might later on become redissolved in the distillate. This is extremely significant regarding the design of the condenser in the last stage, in that a separate gas eliminator is not then required in the condenser, and the condenser surfaces may be colder. In other words, the condenser of the last stage in the distilling apparatus is without a separate gas removal connector.

The vapor pressure in the purifying means determines the water temperature. The carrier vapor contains condensing energy which may be recovered if desired. The purifying means may be connected at various points of the distilling apparatus, but means for increasing the pressure is then required. After being treated, the feed water continues its course to the distilling stage proper. The purifying means may equally be disposed in conjunction with the distillate outlet tube, immediately after the distilling machine or apparatus, in which case pressure-increasing means are concomitantly required.

BRIEF DESCRIPTION OF THE DRAWINGS

The present invention will now be described in greater detail, with reference to advantageous embodiments thereof illustrated in the accompanying figures, in which.

DESCRIPTION OF THE PREFERRED EMBODIMENTS

Figure 1:
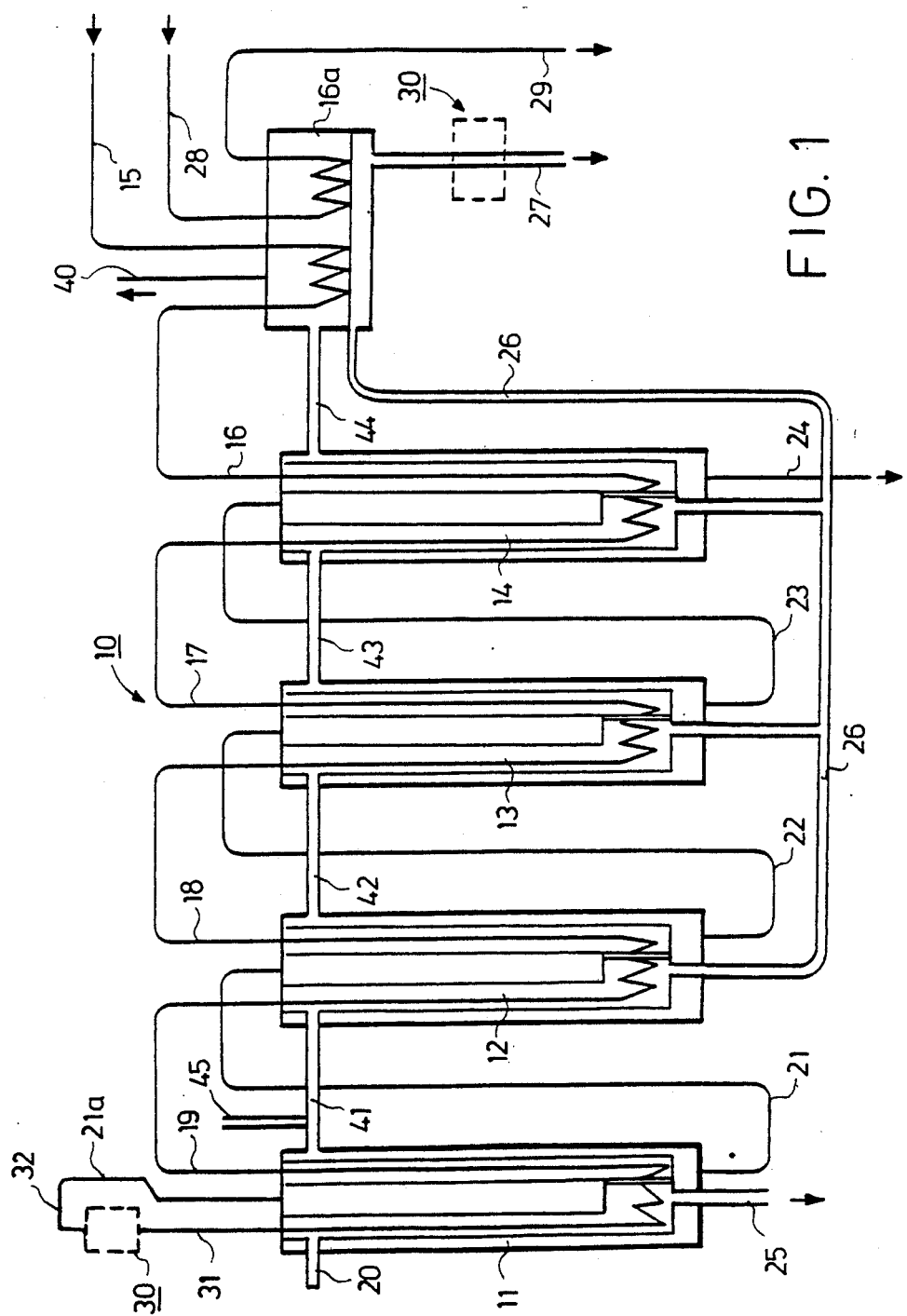
FIG. 1 is a schematic diagram of a distilling apparatus in conjunction with which a device and method in accordance with the present invention have been applied.

In FIG. 1, the feed water (15° C., 8–10 bar) flows through a connector 15 to a heat exchanger 16a, where the water is warmed up to about 95° C. The water is then carried through columns 14, 13 and 12 to a distilling column 11 through connectors 16, 17, 18 and 19. Thereafter, the water is conducted to purifying means 30 in accordance with the present invention, the location thereof in FIG. 1 being indicated as one of the alternatives according to which the purifying means 30 may be connected in the distilling apparatus 10. In other words, the purifying means 30 may equally be connected at an equivalent point of any other distilling stage, or even after distillation at a connector 27 (please see the dotted lines in FIG. 1 at connector 27). Therefore, the purifying means 30 may be connected to a point at a distilled water delivery end of the distilling apparatus 10.

In the first alternative, the water is conducted after the purifying means 30 to the first distillation stage 11 by a connector 21a. As shown in FIG. 1, the water goes through evaporation in four stages 11, 12, 13, 14. The purified vapor produced in the first stage 11 goes through pipe 41 to serve as heating steam in the next stage 12.

Part of the vapor may be carried elsewhere by a pipe 45. After the first evaporation stage 11, the water continues through a connector 21 to the second stage 12, through a connector 22 to the third stage 13, and through a connector 23 to the fourth stage 14. Plant steam is introduced through a connector 20. Therefore, the unevaporated part of the water to be distilled is carried by the connectors 21, 22 and 23 to the next distilling stages, as previously described. The water evaporated in stage 12 goes in a form of pure steam by a tube 42 to the stage 13, and the pure steam generated therein goes along a tube 43 to the stage 14.

The pure vapor generated in the last stage 14 flows along a tube 44 to the condenser/heat exchanger 16a, where the vapor is turned into distilled water. A bottom flow is conducted from the stage 14 by a pipe 24 out from the distilling apparatus 10. The condensate from the heating steam is eliminated through a connector 26 through heat exchanger 16a and is removed by the connector 27. The distillate outflow temperature is about 95–97° C. Cooling water of the heat exchanger 16a (temperature, e.g. 15° C.) flows through a connector 28 and departs along a connector 29, the temperature having increased, e.g. to about 90° C. The condenser of the last stage 14 of the distilling apparatus 10 is without a separate gas removal connector.

Figure 2:
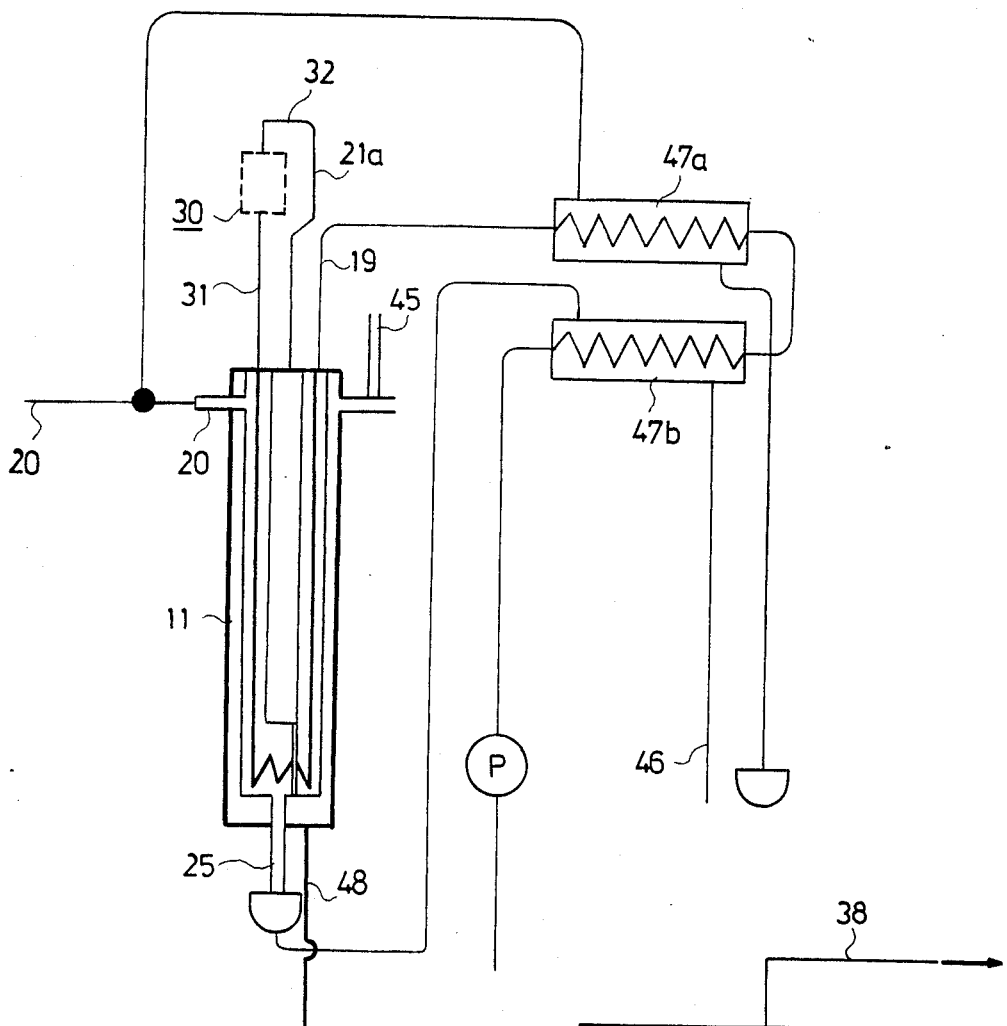
FIG. 2 is a schematic illustration showing the apparatus of the present invention which is adapted for a steam generator.

In FIG. 2, one evaporation column 11 is heated with plant steam, which enters through a pipe 20. Part of the plant steam is diverted to heat a heat exchanger 47a. Condensate 25 departing from the column 11 is conducted to heat a second heat exchanger 47b. The feed water passes through the heat exchangers 47b, 47a along pipe 46. The preheated feed water flows along pipe 19 to the column 11, and then by pipe 31 to the purifying means 30 as illustrated.

After the purifying means 30, the water flows along pipe 21a to be evaporated. The pure vapor flows out from a tube 45. The bottom flow from a pipe 48 is carried to a sewer.

Figure 3:
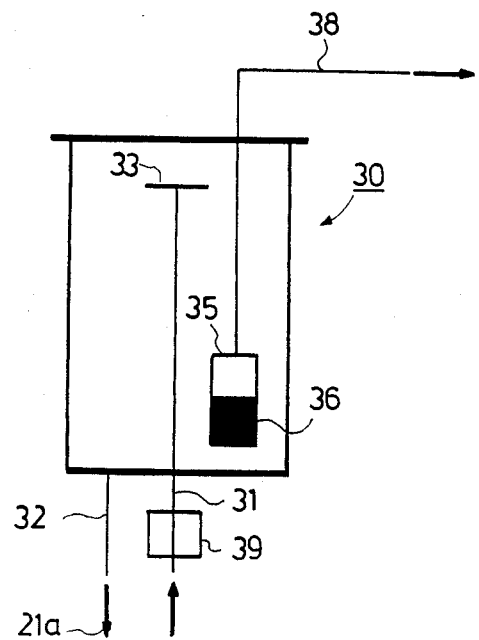
FIG. 3 is a schematic illustration of the purification device in accordance with the present invention.

In FIG. 3, water to be purified which has a temperature of about 160° C. or nearly equal to the temperature of the plant steam which is about 175° C., is conducted to a heat exchanger 39 connected to the connector 19 before the purifying means 30, to be heated to about 162° C. The purifying means 30 operates in the following manner. After the heat exchanger 39, the feed water continues through a connector 31 to a nozzle 33. The water discharges from the nozzle 33 into a space having lower pressure, whereby part of the water evaporates. The water is spread in the means 30 with the aid of a disperser plate 33.

Several purifying means 30 may be situated one after each other. In case there are several purifying means 30 in series and the temperature of the feed water after the first purifying means 30 is about 158° C., the temperature must drop down stepwise in the next purifying means 30. The purifying process can be made highly efficient by connecting in series several purifying means 30 according to the present invention, because the elimination power of one purifying means 30 is up to about 90%. However, the heat exchanger 39 is not indispensable in view of the operation of purifying means 30.

The purifying means 30 also comprise separator means 35 with a controller 36 incorporated therein for maintaining correct water level. The pressure prevailing inside the purifying means 30 maintains equilibrium of vapor and gas. The controller 36 comprises a float, e.g. a floating bobber, and the system operates in such a manner that when water level rises in the lower part of the purifying means 30 to a given limit, a valve above the separator means closes, and when the water level drops down to a given limit, the same valve opens and gas escapes on top through the connector 32, which is equivalent to the connector 21a and 21 in FIG. 1, to the next distilling step.

Table 2 is a listing of physical characteristics of certain of the volatile substances that have been separated from liquid in accordance with the present invention, while Table 3 documents results from certain experiments that have been carried out in accordance with the present invention herein.

The preceding description of the present invention is merely exemplary, and is not intended to limit the scope thereof in any way.

TABLE 1
Volatile impurities, exemplary substances

Volatile hydrocarbons
Alkanes and alkenes
C8-alkane
n-decane
n-nonane
C9-alkene
Halogenated alkanes and alkenes
Carbon tetrachloride
1,2-dichloroethane
1,1-dichloroethane
Tetrachloroethylene
Trichloroethylene TABLE 1-continued
Volatile impurities, exemplary substances Trihalomethanes
Chloroform
Dichlorobromomethane
Dibromochloromethane
Bromoform
Chlorophenol
2,4,6-trichlorophenol
Benzene derivatives
Chlorobenzene
Ethylbenzene
$C_5$-benzene
$C_4$-benzene
N-propylbenzene
Methylethylbenzene
Toluene
M-xylene
P-xylene
O-xylene
Styrene

TABLE 2

Physical characteristics of some substances that have been investigated:

| Systematic and trivial name | formula | s.v. | d g/ml | m.p. °C. | b.p. °C. | References |
|---|---|---|---|---|---|---|
| trichloromethane (chloroform) | $CHCl_3$ | 119.38 | 1.446 | −63 | 61.0 | Grissinger & Banks 1986 |
| 1,1,1-trichloroethane | $CH_3CCl_3$ | 133.41 | 1.338 | −50 | 75.0 | Grissinger & Banks 1986 |
| tetrachloromethane | $CCl_4$ | 153.82 | 1.594 | −23 | 77.0 | Grissinger & Banks 1986 |
| trichloroethylene | $ClCH=CCl_2$ | 131.39 | 1.464 | −87 | 86.9 | Grissinger & Banks 1986 |
| bromodichloromethane | $CHBrd_2$ | 163.83 | 1.980 | 55 | 87.0 | Grissinger & Banks 1986 |
| bromotrichloromethane | $CBrCl_3$ | 198.28 | 2.012 | −6 | 108.0 | Grissinger & Banks 1986 |
| chlorodibromomethane | $CHBr_2Cl$ | 208.29 | 2.451 | −22 | 119.5 | Grissinger & Banks 1986 |
| 1,2-dibromomethane | $BrCH_2CH_2Br$ | 187.84 | 2.180 | 8 | 131.5 | Grissinger & Banks 1986 |
| tetrachloroethylene | $Cl_2C=CCl_2$ | 165.83 | 1.623 | −22 | 121.0 | Grissinger & Banks 1986 |
| trichloromethane (bromoform) | $CHBr_3$ | 252.75 | 2.894 | 8.3 | 150.5 | Grissinger & Banks 1986 |
| benzene | (phenyl ring) | 78.12 | 0.879 | 5.5 | 80.1 | Grissinger & Banks 1986 |
| 1,3-dimethylbenzene (n-xylene) | (m-xylene structure) | 106.17 | 0.864 | −47.9 | 139.1 | Grissinger & Banks 1986 |
| 1,2-dimethylbenzene (p-xylene) | (p-xylene structure) | 106.17 | 0.861 | 13.3 | 138.4 | Grissinger & Banks 1986 |
| 1,2-dimethylbenzene (o-xylene) | (o-xylene structure) | 106.17 | 0.880 | −25.2 | 144.4 | Weast, K. C. 1976 |
| methylbenzene (toluene) | (toluene structure) | 92.15 | 0.867 | −95 | 110.6 | Veller C. R. 1965 |

TABLE 3

Results of experiments that have been carried out
The summarizing results for some model compounds are presented in TABLE 1, as an average reduction percent.

| Model compounds tested | Distillate without preheating | Distillate with preheating | Distillate with doubled preheating |
|---|---|---|---|
| Tolatile halocarbons | | | |
| Trichloromethane | 97.7 | 98.4 | 99.1 |
| Promodichloromethane | 98.0 | 99.8 | 99.7 |
| Chlorodibromomethane | 80.0 | 98.9 | 98.8 |

TABLE 3-continued

Results of experiments that have been carried out
The summarizing results for some model compounds are
presented in TABLE 1, as an average reduction percent.

| Model compounds tested | Distillate without preheating | Distillate with preheating | Distillate with doubled preheating |
|---|---|---|---|
| 1,1,1-Trichloroethane | 51.1 | 77.4 | 86.5 |
| Benzene derivatives | | | |
| Toluene | 51.1 | 41.7 | 85.8 |
| Total | 94.5 | 96.0 | 97.1 |

What is claimed is:

1. Method for removing dissolved volatile substance including halogenated hydrocarbon from feed water, comprising the steps of
   heating the feed water to temperature at which part of the feed water changes into vapor,
   conducting the remaining feed water to a purifying device and discharging the feed water as a thin film into the purifying device, whereby more of the feed water changes into the vapor,
   separating the vapor generated in the purifying device from the remaining feed water and conducting the vapor away from the feed water, and
   then conducting said thus-purified feed water into at least one stage of a distilling apparatus or evaporator,
   whereby the thus-purified feed water is evaporated or distilled and the volatile substance which is present in the vapor is removed away from the feed water prior to said distilling or evaporating,
   wherein when the feed water is discharged as the thin film into the purifying device, more of the feed water changes into the vapor which disperses the film into numerous droplets,
   the film impinging on a wall of the purifying device contributes to conversion of the volatile substance into vaporous form and
   as the feed water runs further down the wall, particles of the vaporous volatile substance join the vapor that has been generated from the feed water.

2. The method of claim 1, wherein
   said feed water is discharged into said purifying device from an inlet connector extending up through said purifying device to an upper part thereof, and
   said vapor generated in the purifying device is separated from the remaining feed water by separation means provided directly within said purifying device.

3. Device for removing dissolved volatile substance from feed water comprising
   an inlet connector for connection to a source of the feed water to be purified, and for conducting the feed water to the device,
   a disperser member for spreading the feed water in the device,
   means for separating vapor including the volatile substance,
   an outlet pipe for conducting the vapor out of the device, and
   an outlet connector coupled to said device for passing said thus-purified feed water to a distilling apparatus or evaporator,
   said disperser member being arranged in said device to discharge the feed water therein as a thin film on a wall of said device,
   so that part of the feed water changes into vapor which disperses the remaining feed water into numerous droplets running down said wall, which contributes to converting the volatile substance to vaporous form which mixes with the vapor and is then separated by said separating means and is charged through said outlet pipe.

4. The device of claim 3, wherein
   said inlet connector extends up through said purifying device to an upper portion thereof,
   said disperser member is coupled to an end of said inlet connector, and
   said separating means are positioned directly within said purifying device and are coupled to said outlet pipe.

* * * * *